United States Patent [19]

Doetsch et al.

[11] Patent Number: 5,203,877
[45] Date of Patent: Apr. 20, 1993

[54] PROCESS FOR PRODUCING SODIUM PERBORATE MONOHYDRATE AGGLOMERATE

[75] Inventors: Werner Doetsch, Bad Hoenningen; Richard Roesler, Rheinbrohl; Hans-Ludwig Pfeifer, Bad Hoenningen, all of Fed. Rep. of Germany

[73] Assignee: Peroxid-Chemie GmbH, Munich, Fed. Rep. of Germany

[21] Appl. No.: 739,501

[22] Filed: Aug. 2, 1991

[30] Foreign Application Priority Data

Aug. 16, 1990 [DE] Fed. Rep. of Germany ....... 4025856

[51] Int. Cl.$^5$ .......................... C01B 15/12; C22B 1/16
[52] U.S. Cl. ................................... 23/313 R; 423/281
[58] Field of Search ........................ 423/281; 23/313 R

[56] References Cited

U.S. PATENT DOCUMENTS

| | | | |
|---|---|---|---|
| 3,822,177 | 7/1974 | Moked | 23/313 |
| 3,914,380 | 10/1975 | Dillenburg et al. | 423/279 |
| 4,071,462 | 1/1978 | Matsunaga et al. | 423/281 |
| 4,405,486 | 9/1983 | Eoga | 23/313 R |
| 4,800,055 | 1/1989 | Klee et al. | 423/315 |
| 4,968,500 | 11/1990 | Bertsch-Frank et al. | 423/281 |

FOREIGN PATENT DOCUMENTS

| | | |
|---|---|---|
| 433653 | 6/1991 | European Pat. Off. . |
| 246713 | 12/1910 | Fed. Rep. of Germany . |
| 534282 | 2/1928 | Fed. Rep. of Germany . |
| 1037432 | 11/1956 | Fed. Rep. of Germany . |
| 1052372 | 3/1959 | Fed. Rep. of Germany ...... 423/281 |
| 1112502 | 8/1961 | Fed. Rep. of Germany ...... 423/281 |
| WO91/02696 | 3/1991 | PCT Int'l Appl. . |
| 1520127 | 8/1978 | United Kingdom . |

OTHER PUBLICATIONS

Jon E. Browning, "Agglomeration; Growing Larger in Applications and Technology," *Chemical Engineering,* (Dec. 4, 1967), pp. 147–169.

*Primary Examiner*—Wayne Langel
*Attorney, Agent, or Firm*—Foley & Lardner

[57] ABSTRACT

A process for producing sodium perborate monohydrate agglomerates or granules in which primary particles of sodium perborate monohydrate produced from sodium perborate tetrahydrate by a dehydration process are subjected to compacting pressing agglomeration, and the resulting agglomerates are subsequently comminuted to granules.

7 Claims, No Drawings

PROCESS FOR PRODUCING SODIUM PERBORATE MONOHYDRATE AGGLOMERATE

BACKGROUND OF THE INVENTION

This invention relates to a process for preparing agglomerates or granules of sodium perborate monohydrate (PBS-1) in which PBS-1 primary particles prepared by dehydration of sodium perborate tetrahydrate (PBS-4) are subjected to a compacting pressing-agglomeration process and subsequent comminution, as well as to the PBS-1 granules obtained by the process of the invention.

Sodium perborate monohydrate is a boron oxygen compound which (contrary to the trade name) is essentially free from water of crystallization, which contains peroxy groups and has the composition $NaBO_2(OH)_2$ or "$NaBO_3 \cdot H_2O$". A characteristic structural feature of this substance is the anion ring illustrated as follows:

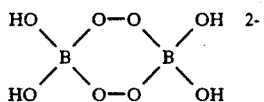

The active oxygen content of PBS-1 is generally 15 to 16 wt. %. The preparation of perborate monohydrate by dehydrating perborate tetrahydrate is known in the art. U.S. Pat. No. 3,914,380 and UK patent Application No. GB 1,520,127 describe the preparation of attrition-resistant sodium perborate monohydrate by dehydration of sodium perborate tetrahydrate obtained by crystallization in which a relative humidity level of 40 to 80%, and preferably of 50 to 70%, is maintained in the air surrounding the crystal grains and the temperature of the exhaust gas is maintained at a minimum of 60° C. in order to achieve partial melting of the perborate.

Although it is possible according to the state of the art to prepare an attrition-resistant PBS-1 with excellent properties, particularly with respect to attrition resistance and rate of dissolution, such PBS-1 is insufficiently compatible with constituents of dishwashing agent formulations for use in dishwashers, and it would also be desirable if such sodium perborate monohydrate could be further improved with respect to its stability in powdered laundry detergent formulations.

SUMMARY OF THE INVENTION

It was therefore the object of the invention to provide an improved process for preparing sodium perborate monohydrate.

Another object of the invention is to provide sodium perborate monohydrate which exhibits improved thermal stability as well as good attrition resistance and a good dissolution rate.

A further object of the invention it to provide sodium perborate monohydrate which overcomes the disadvantages of prior art sodium perborate monohydrate.

These and other objects of the invention are achieved by providing a process for producing sodium perborate monohydrate granules comprising the steps of:
compacting primary particles prepared by dehydration of sodium perborate tetrahydrate by pressing-agglomeration without addition of agglomeration agents using an at least lightly textured roller press to form compressed strips, and
comminuting the resulting compressed strips of sodium perborate monohydrate to a granular material having a desired grain size.

In accordance with a further aspect of the invention, the objects are achieved by providing sodium perborate monohydrate granules obtained by compacting primary particles prepared by dehydration of sodium perborate tetrahydrate by pressing-agglomeration without addition of agglomeration agents using an at least lightly textured roller press to form compressed strips, and 2) comminuting the resulting compressed strips of sodium perborate monohydrate to a granular material having a desired grain size.

DETAILED DESCRIPTION OF PREFERRED EMBODIMENTS

The invention provides a process for the preparation of sodium perborate monohydrate granules, which is characterized in that sodium perborate monohydrate primary particles prepared from sodium perborate tetrahydrate by a dehydration process are compacted to compressed strips by pressing-agglomeration, and the resulting compressed strips of sodium perborate monohydrate are comminuted to granular material with the required grain size. According to the process of the invention, it is thus surprisingly possible to compact the sodium perborate primary particles to compressed strips by pressing-agglomeration without the addition of agglomerating agents, provided the pressing-agglomeration is carried out with a roller press which is at least lightly textured on the surface. Although the invention particularly relates to sodium perborate monohydrate granules, it should be pointed out that the process according to the invention leads to products with improved properties in the case of other alkali and alkaline earth metal perborates.

According to the process of the invention, substantially dry primary particles are subjected to a pressing process and compacted by exerting the pressure applied for this purposes. The required agglomeration of the primary particles used is brought about as a result. Since agglomeration is effected by pressing or exerting a pressure, the compacting pressing process is also called pressing or pressure-agglomeration or, in the case of the preparation of granular material, pressing or pressure granulation. The pressing-agglomeration process for preparing agglomerates or granular material must therefore be distinguished from the so-called agglomerative agglomeration processes (agglomerative granulation processes) in which bonding of the particles is achieved exclusively by bonding with liquid (e.g. water) and/or binders and without any significant pressure effect.

The use of agglomeration processes for improving product properties is known. For example, in the prior art agglomerates are produced inter alia in order to obtain products exhibiting a depot (delayed release) effect. On the other hand, it is surprising that pressing-agglomeration of the sodium perborate monohydrate primary particles does not, in spite of the compacting effect of this process, lead to products with a delayed release (depot) effect i.e. sustained release or delayed dissolution of the product. On the contrary, products obtained by pressing-agglomeration of the sodium perborate primary particles have an essentially unchanged rate of dissolution in water or predominantly water-containing media in comparison with the primary particles.

The temperature range in which the pressing-agglomeration process of the invention can be carried out corresponds to the temperature range in which the thermal stability of the active oxygen-containing compounds used is good and in which the process can be carried out without safety problems. In an advantageous embodiment of the invention, pressing-agglomeration of the primary particles composed of sodium perborate monohydrate is carried out, for example, at temperatures between approximately 20° and 50° C. In this temperature range, the process can be carried out without significant adverse effect on the active oxygen content of the sodium perborate primary particles to be pressed; i.e. active oxygen losses that adversely affect the product are not observed.

Although the magnitude of the pressure applied in order to obtain the advantages of the invention may be freely selected within broad limits and can therefore be tailored to specific desires and product requirements, the lower limit of the pressure is determined by two factors. On the one hand, the minimum pressure to be applied should be sufficient to confer sufficient mechanical strength and bulk density on the agglomerate of primary particles and, on the other hand, to obtain at the same time a sufficient increase in stability in dishwashing agents for use in dishwashers, in particular, and also in powdered laundry detergents. The minimum pressing pressure to be applied in order to achieve the desired properties depends on the type of pressing apparatus used and can easily be determined by a skilled artisan by routine tests of the desired product properties. The upper limit of the pressure to be applied is not critical and is limited solely by the maximum achievable or permissible pressure of the apparatus used for the pressing-agglomeration. In one illustrative embodiment of the invention given as an example, the primary particles composed of sodium perborate monohydrate are compacted in a roller press by pressing at pressures of from 0.2 tons to approx. 2 tons per cm of roller length. Compaction is preferably carried out at a pressure of at least 0.8 tons per cm of roller length.

In comparison with the heaps of fine primary particles, the agglomerates obtained according to the invention as intermediates are formed products (compressed strips) which can be converted by comminution into agglomerate material (granular material) which exhibits improved shape and appearance. In powdered laundry detergent, cleaning-agent and dishwashing compositions, the granular material obtained has a lesser tendency to form dust, to adhere, to segregate and in particular to cake. It can be satisfactorily metered and transported and has excellent free-flowing properties and a well-defined bulk density. According to the process of the invention, product properties such as agglomerate shape and size, granule shape and size, and bulk density of the peroxy borate can be matched to the requirements of various applications or other market requirements. Particularly heavy and coarse perborate products, which cannot be obtained from perborate tetrahydrate (PBS-4) by the conventional preparation of PBS-1 alone, can thus be produced by the method according to the invention.

Any conventional, at least lightly textured roller press may be used for the process of the invention. According to the invention, it is not necessary to agglomerate the primary particles by pressing in a moist condition or, if necessary, with an addition of small quantities of liquid, binder, flux, further auxiliaries and/or other additives. The advantages of the invention consist in the use of a pressing-agglomeration process in which dry primary particle material is pressed entirely in the dry state. In this process, the stability of the product (particularly the active oxygen stability) cannot be adversely affected by the presence or the addition of liquid (particularly water), and there is no need for drying after agglomeration. Another advantage is that although binders, flux and/or other auxiliaries may be added if desired, such additives are not essential for the carrying out the process and can be omitted in the process according to the invention using at least lightly textured roller presses. Consequently, undesirable changes to the properties of the pressed sodium perborate monohydrate agglomerates and the granular material prepared therefrom, possibly caused by these additives and auxiliaries, can be avoided. On the other hand, however, it is quite possible to mix other desirable additives that modify the properties of the agglomerates and/or granular material in an advantageous manner, e.g. pigments, homogeneously with the primary particles to be pressed, before pressing agglomeration.

In the process according to the invention, at least lightly textured roller presses (structured rollers) are used. The structured rollers are fluted or continuously profiled rollers for producing structured or profiled sheets (compressed strips) or tapes. In the case of textured rollers, slightly or more strongly profiled rollers, the latter can be used in an open or closed setting. In this way, slightly or more strongly textured (e.g. waffle type) compressed strips, corrugated strips or tapes are obtained.

The products such as compressed strips, corrugated strips or tapes obtained by pressing-agglomeration can be comminuted to granules of the desired particle size and bulk density by known prior art processes. For comminution purposes, compressed cake or strip cutters, for example, are suitable for coarse granulation, or granulating screens are suitable for fine granulation. For example, sodium perborate monohydrate granules having an average grain diameter within the range from 0.1 to 10 mm can be obtained in this way. Advantageous and preferred average grain diameters are described in more detail below.

The primary particles of PBS-1 introduced into the pressing-agglomeration stage in the process of to the invention are produced from crystallized sodium perborate tetrahydrate (PBS-4) by a standard dehydration process. Both the production of the primary particles in the dehydration process and pressing-agglomeration can be carried out continuously and independently of each other. It is not essential to pass the primary particles to the pressing-agglomeration stage immediately after they have been produced in the dehydration process. It is thus quite possible for the primary particle material to undergo e.g. intermediate storage, or for dehydration and pressing agglomeration to be carried out in separate plants.

A particularly advantageous embodiment of the invention is the fully continuous method of operation. In this fully continuous method of operation, dry primary particles are passed to a pressing-agglomeration facility immediately after they have been obtained and pressed to form compressed strips, and the compressed strips are subsequently comminuted to granules of the desired particle size and bulk density.

The primary particles used in an advantageous embodiment of the process of the invention are particles of sodium perborate monohydrate which are substantially dry and free of water of crystallization and which can be obtained by any known prior art dehydration process.

Sodium perborate monohydrate primary particles which exhibit a certain minimum surface area are particularly suitable for the process according to the invention. PBS-1 primary particles with a specific surface area (measured according to BET) in the range from 4 $m^2/g$ to approximately 10 $m^2/g$ are particularly suitable. PBS-1 primary particles with specific areas of more than 5 $m^2/g$, especially more than 6 $m^2/g$, are preferably used for pressing-agglomeration without the addition of auxiliary agglomerating agents.

Known drying apparatus, such as fluidized bed dryers, vibrating dryers, flow dryers or even combinations of dryers of various designs for dehydrating centrifuge-moist sodium perborate tetrahydrate, may be used for dehydrating PBS-4 to PBS-1. Additional equipment is not necessary. In the preparation of perborate monohydrate according to the processes of U.S. Pat. No. 3,914,380 and UK Patent Application No. GB 1,520,127, however, appropriate devices for metering water vapor into the dehydration air in order to maintain and monitor the level of relative atmospheric humidity desired in such processes may be present. However, dehydration equipment is advantageously used which allows water vapor to be introduced in a continuous stream of air or exhaust gas to be recycled. In order to produce the PBS-1 primary particles, the process conditions suitable for the preparation of sodium perborate monohydrate from sodium perborate tetrahydrate in the aforementioned dehydration apparatus are determined in a known manner.

Because the stability of sodium perborate tetrahydrate in the dry state is greatly affected by the use of suitable stabilizers, stabilizers suitable for percompounds are introduced during the preparation of PBS-4 from sodium metaborate and hydrogen peroxide (with subsequent crystallization). Such stabilizers subsequently also stabilize the PBS-1 produced from PBS-4 by dehydration. The stabilizers are used in inherently suitable quantities for stabilizing perborate compounds. Examples of suitable stabilizers include alkali metal or magnesium silicates, magnesium sulfate, phosphates such as metaphosphate, organic stabilizers such as quinolinic acid, salicylic acid or dipicolinic acid (DPA), chelating agents such as 8-oxyquinoline or ethylenediamine tetraacetic acid (EDTA). phosphonic acid derivatives such as methylene or aminomethylene phosphonic acids or salts thereof, and also small quantities of conventional wetting agents. Stabilizers can be present in the solutions or suspensions for crystallizing the tetrahydrate in customary concentrations of from 0.1 to 10 g/kg. The stabilizers are preferably introduced directly into the reaction mixtures for preparing the sodium perborate tetrahydrate. This can be achieved in a simple manner via the hydrogen peroxide solution used. In particular, the stabilizers are used in such quantities as should be present later in the sodium perborate monohydrate agglomerates or granules.

The invention also relates to sodium perborate monohydrate granules. Advantageous sodium perborate monohydrate granules according to the invention generally have average grain diameters within the range from 0.3 to 3 mm. Advantageous granules according to the invention are characterized by average grain diameters of more than 0.5 mm, and preferably of more than 1 mm, and by bulk densities of more than 0.6 g/ml to 0.9 g/ml, and preferably of more than 0.75 g/ml to 0.9 g/ml. In addition, they exhibit excellent attrition resistance and a reduced tendency to cake in powdered laundry detergent, cleaning-agent and dishwashing compositions for use in dishwashers.

The sodium perborate monohydrate granules of the invention are characterized by a rate of dissolution in water which continues to be high in comparison with non-compacted PBS-1. The rate of dissolution is for example in the case of advantageous sodium perborate monohydrate granules more than 80% and in the case of preferred sodium perborate monohydrate granules in fact more than 90%. The rate of dissolution is determined under standard conditions: 3 minutes, 15° C., 2 g/l.

The invention also relates to colored perborate monohydrate granules which can be prepared according to the process of the invention by homogeneously mixing a pigment powder into the PBS-1 primary particles prior to the pressing-agglomeration process stage.

The invention provides a simple process for preparing sodium perborate monohydrate. According to the process of the invention, granular material which is suitable for a large number of different applications in the bleaching, disinfecting, cleaning and detergent sectors, and which is also outstandingly suitable for use in dishwashing agents for use in dishwashers in particular, can be produced in a simple manner. The granules that can be prepared according to the process of the invention can be optimally adapted in the desired manner e.g. in terms of their properties such as particle size or bulk density and can therefore be easily tailored to varying requirements, e.g. the grain sizes and bulk densities of other formulation constituents. In contrast to standard moist granulation methods (build-up granulation process), the process embodiments of the process of the invention ("dry granulation process") avoid any effect of moisture (e.g. free water or water of crystallization) on the primary particles which are produced and yields sodium perborate monohydrate agglomerates or granules having good product properties. The perborate granules according to the invention exhibit an undiminished high rate of dissolution in aqueous media and markedly improved storage stability. This is manifested on the one hand in the good stability of the active oxygen content, so that active oxygen losses are markedly reduced even under extreme storage conditions. On the other hand, the sodium perborate monohydrate granules according to the invention exhibit an improved caking behavior, i.e. a markedly reduced caking tendency, in laundry detergent, cleaning-agent and dishwashing compositions in powder form.

The invention is illustrated in further detail by the following non-limiting examples.

The following abbreviations are used in the examples:
Avox = active oxygen
Mg stearate = magnesium stearate
n.d = not determined.

EXAMPLE 1

Following the procedures disclosed in U.S. Pat. No. 3,914,380 and UK Patent Application No. GB 1,520,127, primary particles of sodium perborate monohydrate were first prepared from sodium perborate tetrahydrate (obtained by a known conventional industrial method of preparing crystalline sodium perborate tetrahydrate). The primary particles obtained, which were dry and free from water of crystallization, were collected and transferred to a slightly textured rolling press for pressing-agglomeration. The primary particles were pressed at a pressure of from 0.8 tons/cm roller length (=approx. 50 bar) to 1.6 tons/cm roller length (=approx 100 bar) to form compressed strips having a thickness of 1 mm. The compressed strips were subsequently finely granulated using granulating screens (mesh size 2 mm or 3.5 mm) in a manner known in the art. The PBS-1 primary particles used (V1) and the sodium perborate monohydrate granules produced therefrom exhibited the product properties shown in Table 1. In examples 1c to 1f the granulated material was separated with finer screens into grain size fractions within the grain distribution ranges given in Table 1. In examples 1a to 1f according to the invention, no agglomeration aids for pressing-agglomeration were added to the PBS-1 primary particles to be compacted. A reference example (V2) shows that the rate of dissolution of the PBS-1 granules produced can be substantially decreased by additions such as magnesium stearate during pressing agglomeration.

C. and 70% relative atmospheric humidity. Following storage periods of 1, 2, 4 and 8 weeks, respectively, the decomposition-related active oxygen loss was determined (active oxygen content prior to and following storage was determined by known titration methods). For comparison purposes, the stability of the primary particles (=conventional sodium perborate monohydrate prepared by fluidized bed drying of sodium perborate tetrahydrate obtained by crystallization) was determined under corresponding conditions. The results obtained are summarized in Table 2.

TABLE 2

| Product | Residual Avox in % by weeks | | | |
|---|---|---|---|---|
| No. | 1st week | 2nd week | 3rd week | 4th week |
| 1b | 96 | 95 | 78 | 68 |
| 1c | 93 | 91 | 88 | 82 |
| Comparison PBS-1 (Primary particles) | 88 | 82 | 78 | 55 |

The foregoing description and examples have been set forth merely to illustrate the invention and are not

TABLE 1

| | Comparison* primary particle PBS-1 | | Sodium perborate monohydrate granules according to the invention | | | | | |
|---|---|---|---|---|---|---|---|---|
| | V1 | V2 | 1a | 1b | 1c | 1d | 1e | 1f |
| AVOX (%) | 15.6 | 15.6 | 15.6 | 15.2 | 15.6 | 15.6 | 15.6 | 15.6 |
| bulk density (kg/liter) | 0.58 | 0.84 | 0.68 | 0.77 | 0.69 | 0.63 | 0.60 | 0.58 |
| Rate of dissolution | | | | | | | | |
| (%) 1 min | 96 | 21 | 89 | 64 | 47 | 78 | 94 | 97 |
| 2g/l 2 min | 96 | 37 | 100 | 87 | 67 | 91 | 98 | 99 |
| 15° C. 3 min | 96 | 50 | 100 | 94 | 81 | 95 | 100 | 99 |
| Attrition % | 5.8 | 5.1 | 5.1 | 6.3 | n.d. | n.d. | n.d. | n.d. |
| (%) Grain Distribution | | | | | | | | |
| >2000 μm | | | | | 100 | | | |
| <2000 >1000 μm | | | | | | 100 | | |
| <1000 >630 μm | | | | | | | 100 | |
| <630 >250 μm | | | | | | | | 100 |
| >1000 μm | 0 | 70.2 | 53.4 | 48.7 | | | | |
| <1000 μm >800 μm | 0.1 | 12.0 | 17.0 | 16.5 | | | | |
| <800 μm >600 μm | 2.3 | 5.8 | 8.1 | 9.3 | | | | |
| <600 μm >500 μm | 21.1 | 5.2 | 8.5 | 8.7 | | | | |
| <500 μm >420 μm | 22.4 | 2.4 | 4.5 | 5.5 | | | | |
| <420 μm >300 μm | 35.8 | 3.3 | 6.0 | 7.9 | | | | |
| <300 μm >150 μm | 18.3 | 1.1 | 2.2 | 3.1 | | | | |
| <150 μm | 0 | 0 | 0.4 | 0.3 | | | | |
| Pressure (t/cm roller length | 1.6 | 0.8 | 1.6 | 0.8 | 0.8 | 0.8 | 0.8 | 0.8 |
| Granulating screen (mm) | 2 | 2 | 2 | 3.15 | 3.15 | 3.15 | 3.15 | 3.15 |
| Mg stearate | — | yes | — | — | — | — | — | — |

EXAMPLE 2

In order to examine the chemical stability (Avox stability) of the primary particles used in Example 1 and some of the granules prepared therefrom, their storage stability was investigated. The storage stability was determined in each case by introducing the primary particles and the granules prepared therefrom into a standardized dishwashing agent for use in dishwashers in an amount of 14 wt. % based on the total mixture (other constituents: anhydrous sodium metasilicate 49 wt. %, slightly calcined soda 10 wt. %, sodium tripolyphosphate 25 wt. %, ethoxylated polypropylene glycol 2 wt. %). The resulting mixtures were transferred to wax-laminated cartons and subsequently stored at 37° intended to be limiting. Since modifications of the described embodiments incorporating the spirit and substance of the invention may occur to persons skilled in the art, the invention should be construed to include all variations falling within the scope of the appended claims and equivalents thereof.

What is claimed is:

1. A process for producing sodium perborate monohydrate granules comprising the steps of:
    compacting primary particles prepared by dehydration of sodium perborate tetrahydrate by dry pressing-agglomeration at a temperature in the range from 20° to 50° C. and at a pressure of at least 0.2 tons per cm of roller length without addition of agglomeration agents using an at least lightly textured roller press to form compressed strips, and comminuting the resulting compressed strips of sodium perborate monohydrate to a granular material having a desired average grain diameter within the range from 0.3 to 3 mm.

2. A process according to claim 1, wherein said compacting step is carried out at a pressure of at least 0.8 tons per cm of roller length.

3. A process according to claim 1, further comprising homogeneously mixing pigment powder with the primary particles before said compacting step.

4. A process according to claim 1, wherein said particles have a bulk density in the range from 0.6 g/ml to 0.9 g/ml.

5. A process according to claim 4, wherein said particles have a bulk density in the range from 0.75 g/ml to 0.9 g/ml.

6. A process according to claim 1, wherein said particles of said granular material have an average grain diameter greater than 1 mm.

7. A process according to claim 1, wherein at least about 65% of the particles of said granular material have a particle size of more than 800 $\mu$m.